United States Patent [19]

Shaffer et al.

[11] Patent Number: 5,821,936
[45] Date of Patent: Oct. 13, 1998

[54] INTERFACE METHOD AND SYSTEM FOR SEQUENCING DISPLAY MENU ITEMS

[75] Inventors: Shmuel Shaffer, Palo Alto; Neufito Fernandes, Cupertino, both of Calif.

[73] Assignee: Siemens Business Communication Systems, Inc., Santa Clara, Calif.

[21] Appl. No.: 561,475

[22] Filed: Nov. 20, 1995

[51] Int. Cl.$^6$ ........................................ G06F 3/00
[52] U.S. Cl. .............................................. 345/352
[58] Field of Search ............................ 395/333, 334, 395/352, 353; 345/352, 353, 357

[56] References Cited

U.S. PATENT DOCUMENTS

| | | | |
|---|---|---|---|
| 5,396,264 | 3/1995 | Falcone et al. | 345/146 |
| 5,420,975 | 5/1995 | Blades et al. | 345/334 |
| 5,465,358 | 11/1995 | Blades et al. | 345/339 |
| 5,625,783 | 4/1997 | Ezekiel et al. | 345/352 |

Primary Examiner—A. Katbab

[57] ABSTRACT

A method and system of sequencing menu items of a menu-driven user/system interface includes a resequencing of the menu items in response to the frequency of selection and/or a shift in the primary responsibility of a user. In one embodiment, an initial sequence of the serially presented menu items is stored. The selection of each menu item is counted. The menu items are then rearranged to provide a frequency-based order that presents the most often selected items before the less likely to be selected menu items. The step of resequencing the menu items may be limited to input of a resequencing command by a user or may be limited to predetermined time periods. As another optional feature, the "learning" that occurs by counting the selections can be downloaded from one system and uploaded to another system. In a second embodiment, the rearrangement is task-based. Depending upon the task assigned to the user or depending upon the mode of operation of the system, the menu items are arranged, again with the goal of presenting the most often selected menu items at the beginning of the progression.

10 Claims, 6 Drawing Sheets

| DEFAULT INDEX | UTILIZATION | FREQ. BASED INDEX |
|---|---|---|
| 1 | 15 | 6 |
| 2 | 12 | 5 |
| 3 | 10 | 2 |
| 4 | 3 | 7 |
| 5 | 2 | 1 |
| 6 | 0 | 3 |
| 7 | 0 | 4 |

FIG. 4

| MENU ITEMS |
|---|
| ORIGINAL MENU OPTION 6 |
| ORIGINAL MENU OPTION 5 |
| ORIGINAL MENU OPTION 2 |
| ORIGINAL MENU OPTION 7 |
| ORIGINAL MENU OPTION 1 |
| ORIGINAL MENU OPTION 3 |
| ORIGINAL MENU OPTION 4 |

FIG. 5

INTERFACE METHOD AND SYSTEM FOR SEQUENCING DISPLAY MENU ITEMS

TECHNICAL FIELD

The invention relates generally to methods and systems involving menu-driven interfaces and relates more particularly to determining an optimal sequence of menu items of a user interface.

BACKGROUND ART

User interfaces facilitate interaction between operators and a programmable system. One type of user interface employs a menu-driven approach in which menus are presented for selections of commands and operands. Menu-driven interfaces provide a number of advantages over other approaches to designing an interface. One advantage is that a menu can plainly display a full range of options available to an individual. Another advantage is that the approach is flexible, since a menu can be easily reconfigured. Moreover, a menu-driven interface may be designed to prevent a user from being informed of selections that are outside of a range of possibilities for a given operation.

In most applications, it is preferable to present a user with the entire set of options that are available at a particular level. For example, each menu item at a level may be a text string and the menu items may be listed one atop another on a display screen. A a user interface may be a multilevel interface, with selection of an option at a first level resulting in a display of a second-level menu having menu items relating to the first selection. Optionally, the first level may be a text menu, while the second level may be graphical representations of different options.

In some applications, presenting the entire menu is not practical. Small-screen applications have limited display. Consequently, menu options are presented in a one-by-one manner. The user may select a currently displayed option or may scroll to the next option. Selection of a menu item at a first level may lead to a sequential display of submenu items at a second level.

Examples of small-screen applications in which menu items are displayed sequentially include display telephones and photocopiers. The menu structure and the sequence in which the options are presented are fixed. Thus, if there is a menu item that is routinely selected by a particular individual or group of individuals, but the particular menu item is at the end of the sequence, the user must routinely scroll through most or all of the other menu items in order to reach the desired option. Moreover, there may be modes of operation in which an optimal order of menu-item presentation is different than for other modes of operation for the same device, e.g., display telephone or photocopier. As one example, it is known to have a Computerized Branch Exchange (CBX) system that at least partially governs the activity of a number of Automatic Call Distributor (ACD) agents. Such systems are used for telemarketing, and the preferred sequence of menu items may vary depending upon whether a particular ACD agent is primarily concerned with receiving incoming calls or is primarily concerned with initiating outgoing calls. An "optimal" sequence is one that minimizes the time spent by agents in scrolling through unselected options in order to reach a desired option, since the collective time spent in scrolling will be significant during a telemarketing campaign.

What is needed is a method and system for sequencing menu items of a menu-driven interface such that the time and user manipulation required for selecting one or more menu items to the exclusion of other menu items is reduced.

SUMMARY OF THE INVENTION

A method and system provide automatic resequencing of menu items of a menu-driven user interface. In one embodiment, the resequencing occurs adaptively and is based upon monitoring selections of the menu items over time. The menu items are typically options in which some options are selected and others remain unselected. Each selection of each option is counted. A resequencing of the menu items is determined by the frequency of selection. Thus, the menu options are adaptively rearranged in a frequency-based order, with the most often selected option being presented first in the next utilization of the user interface.

The resequencing may occur after each display of the sequence of menu items, but preferably is carried out only periodically in order to prevent frequent changes to the presentation of the menu items. A fixed time delay factor t may be user-selected. For example, the factor t may be set at one week, restricting the menu adaptation/update to a week-by-week basis.

As another optional feature, the resequencing may be disabled to turn "off" the statistical collection that counts the item selections. In utilizing this feature, the user may invoke a resequence option that initiates rearrangement of the menu items based upon the "learning" that occurred since the adaptation option was last enabled. Allowing adaptation to be enabled and disabled is beneficial for those instances in which a user is performing operations that are exceptions to the norm or are single-time activities. As a related optional feature, the statistical collection may remain "on," but with the resequencing occurring only upon the command of the user. This prevents unexpected and/or unwanted resequencing from causing difficulties for the user.

Second-level menu items are preferably also tracked for frequency of selection. That is, if selection of a particular option in the main menu initiates display of submenu items related to the initial selection, there preferably is a monitoring of the user selection of the submenu items, so that an adaptive frequency-based reordering also occurs at the submenu level.

In a second embodiment of the invention, the resequencing of menu items is task-based, rather than frequency-based. That is, depending upon a designated responsibility of a user or system, menu items of a sequence are ordered. As one example, a particular ACD agent of a telemarketing campaign may be automatically switched by a CBX system between having a primary responsibility of initiating outgoing calls and having a primary responsibility of receiving incoming calls. Typically, the automatic switching is dependent upon the incoming-call traffic. The preferred order of menu options is likely to vary depending upon the primary responsibility of the ACD agent. This second embodiment of the invention resequences the options upon switching of the responsibility. Another example is one in which a combination facsimile/photocopier system will have options (e.g., enlargement of the image) that are more likely to be selected during a photocopying task than during a facsimile-transmission task. The selection process can be reduced in time by presenting the options in a different order, depending upon the selected task.

In both embodiments of the menu-driven interface method and system, the input required for a user to accomplish a desired menu selection process is reduced. Moreover, the processing that must be carried out by the system is potentially reduced. For applications in which the frequency-based order or task-based order is presented via a communication link, the invention reduces traffic on the link.

BRIEF DESCRIPTION OF THE DRAWINGS

FIG. 4 is a utilization table that is frequency-based, in accordance with the process of FIG. 2.

FIG. 5 is a data structure that is formed in accordance with the utilization table of FIG. 4.

BEST MODE FOR CARRYING OUT THE INVENTION

Figure 1:
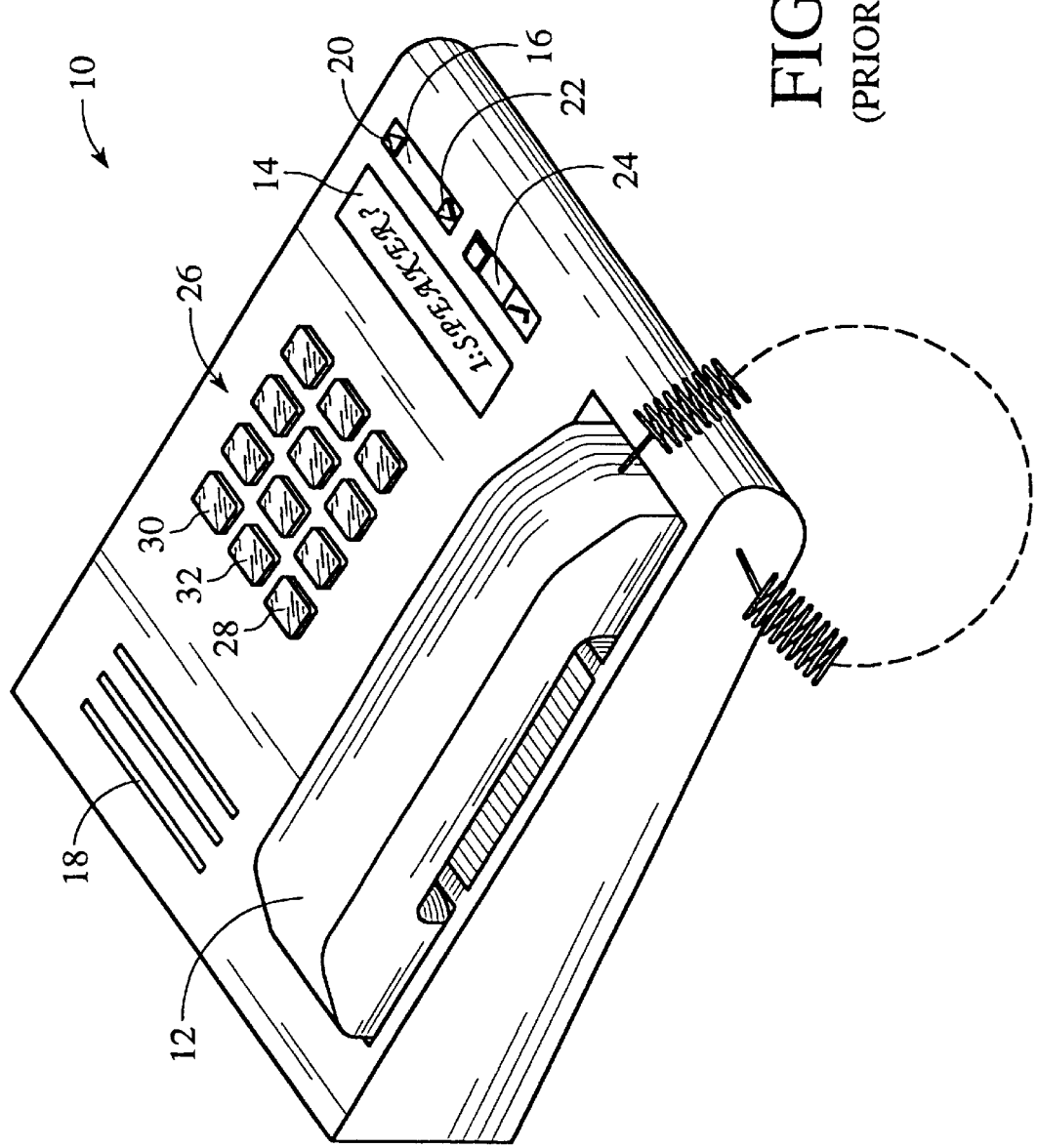
FIG. 1 is a perspective view of a telephone having a small-screen display in accordance with the prior art.

With reference to FIG. 1, a conventional display telephone 10 is shown as having a handset 12. The telephone also includes a small-screen display 14 for presenting alphanumeric menu items. The display allows a presentation of different options in a one-by-one time sequence. A first push control 16 allows a user to scroll through the options. As an example, the option shown in FIG. 1 is a query regarding use of a speaker that is housed within the telephone and directed at vents 18. Pressure at one side of the push control 16 will cause a forward scrolling of the available options, while pressure at the opposite side of the push control will allow a user to scroll in reverse order, as indicated by arrows 20 and 22.

In scrolling through the options of a particular menu, a user may select particular options and leave other options unselected. Selection may be made by depression of a second push control 24 that includes a check mark to graphically represent the function of the push control. While the manipulation of a menu of options may be achieved by means of the push controls 16 and 24, other input mechanisms may be substituted. Alternatively, the standard alphanumeric keyboard 26 may be used as the input device. For example, depression of the number "1" key 28 may be used to scroll the menu rearwardly while depression of the number "3" key 30 may be used for forward scrolling. Selection may be provided by depression of the number "2" key 32.

For the conventional display telephone 10, the sequence in which options are presented is fixed. A concern is that, in practical use, a particular operator or a user group may routinely select only options that are toward the end of the sequence, requiring attention to the scrolling through the sequence until the desired options are reached. A requirement of attentive scrolling through each of the menu items of the sequence translates to time mismanagement, particularly if the sequence is presented numerous times in a short period, such as during a telemarketing campaign. Ideally, the options are presented in an order that reduces or eliminates time mismanagement.

Figure 2:
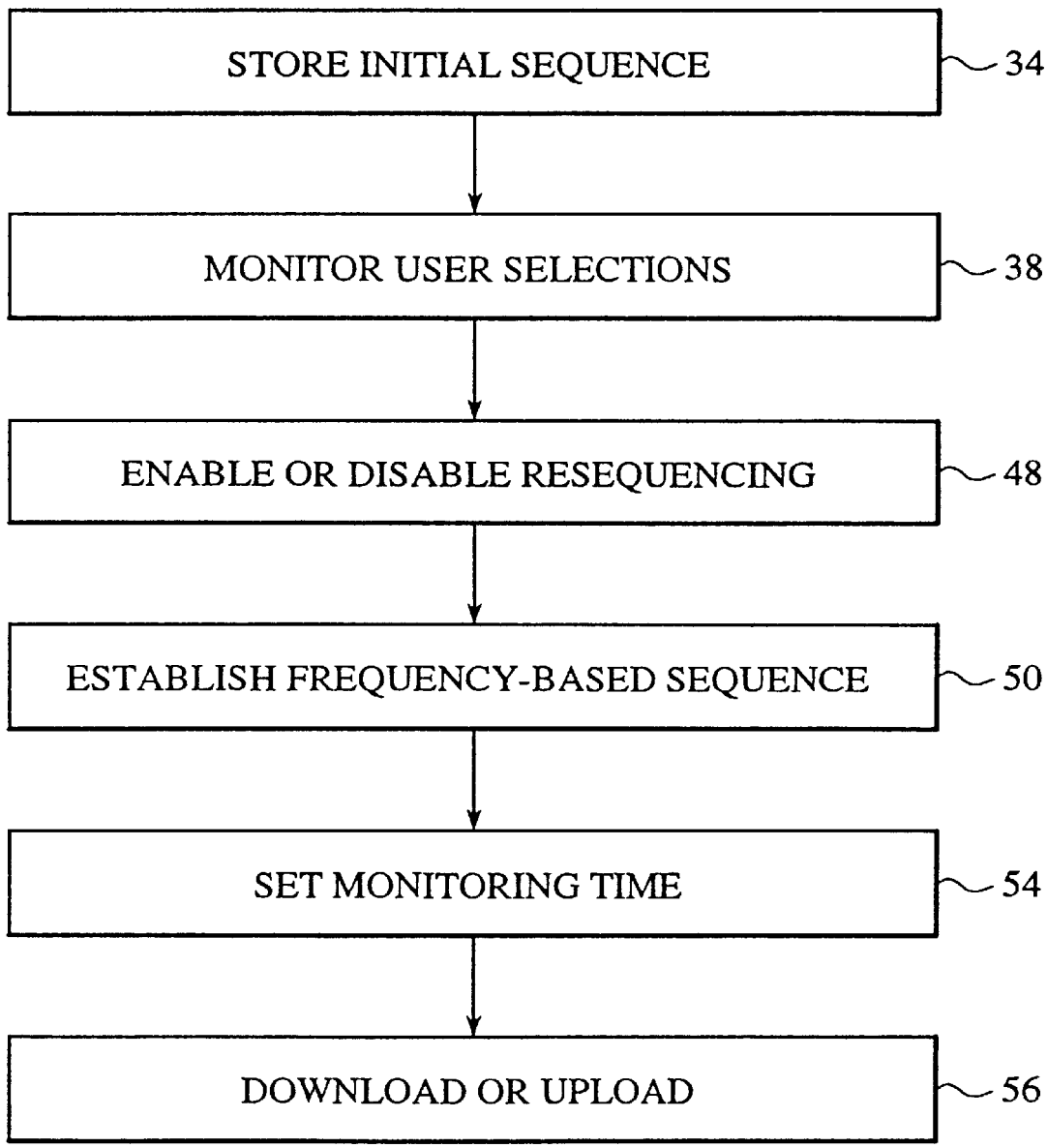
FIG. 2 is an illustration of the process steps for carrying out a first embodiment of the invention.

FIG. 2 is a first embodiment of a system for resequencing menu items that are to be shown in a one-by-one manner. The embodiment of FIG. 2 is an adaptive embodiment in which selections of menu items are counted and a resequencing step then provides a frequency-based progression for subsequent displays.

In a first step 34, an initial sequence is stored. The sequence may be a seven item data structure 36, such as the one shown in FIG. 3. The data structure may be stored in memory at an individual phone, or may be stored at a central exchange. By storing a data structure at the central exchange, the system has the option of allowing resequencing on a phone-by-phone basis, or resequencing based upon selections of the entire user group.

In a second step 38 of FIG. 2, user selections are monitored. A utilization table 40 of FIG. 3 includes a column 42 that is incremented and is used to track selections of each option of the data structure 36. The original, or default, index is shown in column 44, while a frequency-based index is shown at column 46. At the outset, the frequency-based index will be the same as the original index.

A resequencing capability is enabled or disabled at step 48. This step allows a user to turn "off" adaptation of the sequence of the options in the data structure 36. Disabling the adaptation may be desirable for instances in which a user is performing operations that are exceptions to a normal set of circumstances. If the sequence has previously undergone adaptation, the disabling of resequencing resets the utilization column 42 of Table 40 and turns "off" an enable-adaptation flag used by a statistics collector to increment the numbers of the utilization column 42. The sequence of menu items may return to the default index 44, or may employ the previously established frequency-based index of column 46. Steps 38 and 48 may be reversed.

In step 50, resequencing of the menu items takes place. FIG. 4 shows the utilization 40 after a number of presentations of the menu. In this example, option 6 was selected fifteen times, while options 3 and 4 went unselected. As a result, the utilization column 42 and the frequency-based column 46 of the table have been manipulated to place option 6 at the top of the order of menu items to be displayed and to place options 3 and 4 at the end of the display presentation. FIG. 5 is a frequency-based data structure 52 that conforms to the resequencing indicated by FIG. 4. Alternatively, the data structure remains the same, but the frequency-based index of column 46 operates to dictate the sequence of display without rearranging the data structure 36 of FIG. 3. That is, the order of display may vary without manipulating the data structure itself.

Step 38 of monitoring user selections continues as long as the resequencing is enabled. Optionally, the method includes a step 54 that allows a user to set a time delay for resequencing. A fixed time delay factor (t) prevents a constant change to the order of presentation of the menu. For example, if t=1 week, menu adaptations/updates will be initiated only on a weekly basis. Alternatively, the resequencing may be limited to the input of a user command to initiate the resequencing step. As previously noted, this prevents unexpected and/or unwanted resequencing from creating confusion and delays.

Also shown in FIG. 2 is a step 56 of uploading or downloading learning. This option allows a user to download, via an RS232 port or other communication link, the learning that results from use of the previous steps of FIG. 2. A learned optimized sequence of menu items may then be uploaded to a different system. This feature is beneficial in situations in which a particular user is to be transferred or the system-learned skills are applicable to other audiences.

An advantage of the method of FIG. 2 is that the adaptive interface significantly reduces the attentive input required from a user to accomplish a given task. Moreover, there is a reduction of CPU and/or input/output processing on the system running the application. For implementation of the method with systems that include presentation of the menu of options at a site that is remote from the location of the stored menu, the method significantly reduces traffic on the required communication link.

Figure 3:
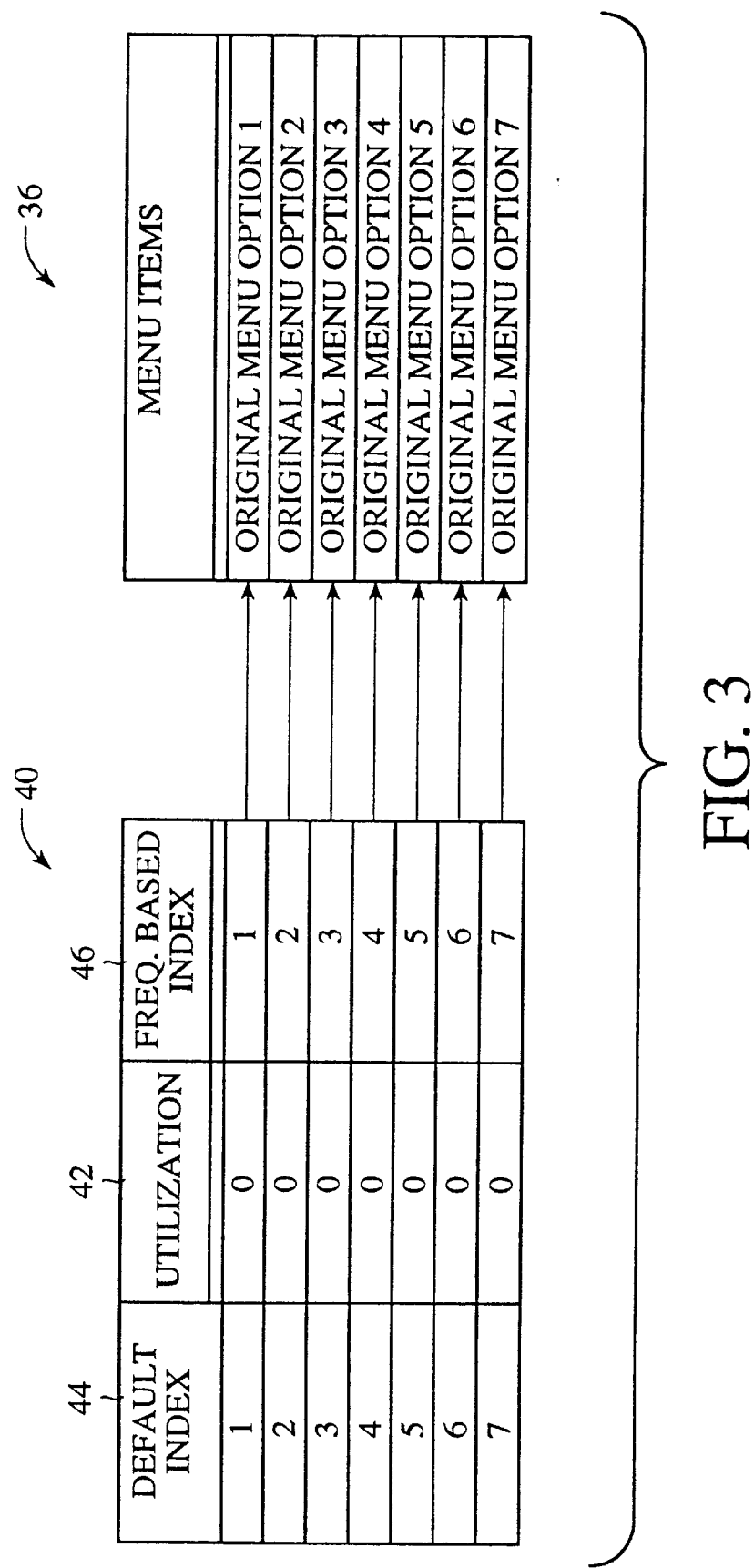
FIG. 3 is an illustration of a utilization table and data structure for storage at the first step of FIG. 2.

The particular options that are represented within the data structure 76 of FIG. 3 are not critical.

Nevertheless, some examples will be cited in order to provide a better understanding of the invention. Menu option "1" may relate to call waiting. Turning call waiting "off" restricts incoming calls that can disturb data transmission. Menu option "2" may relate to caller identify sending. By turning the option "on" the telephone number of the calling party will be displayed on the called party's display telephone. Menu option "3" may relate to trunk access rights, allowing the type of calls that an extension can receive or make to be limited to internal calls or to local calls. Menu option "4" may relate to the prompts that are displayed at the called telephone. For example, the prompts may be in a specified language. This fourth option is likely to have a second-level menu that identifies the available languages, e.g., English, Spanish and French. In the preferred embodiment, the adaptive sequencing techniques are applied to the second-level sequence as well as the first level.

Menu option "5" may relate to whether callers will hear music while on hold. Menu option "6" may relate to which line of a trunk should be used to carry an outgoing call. Finally, menu option "7" may be used by the user to determine whether messages should be displayed for the duration of the telephone call. Such messages may be an indication that an incoming call from a particular person has been received and is on hold. The seven options may be presented to each user on a call-by-call basis. Alternatively, the options may be system-administration features that are presented and selected at a central office of a telephone system, so that each selection governs operation of all of the telephones of the system. That is, the invention is not limited to the embodiment described above. In fact, the adaptive sequencing may be used in applications unrelated to telephones, e.g., interface displays of a photocopier.

Figure 6:
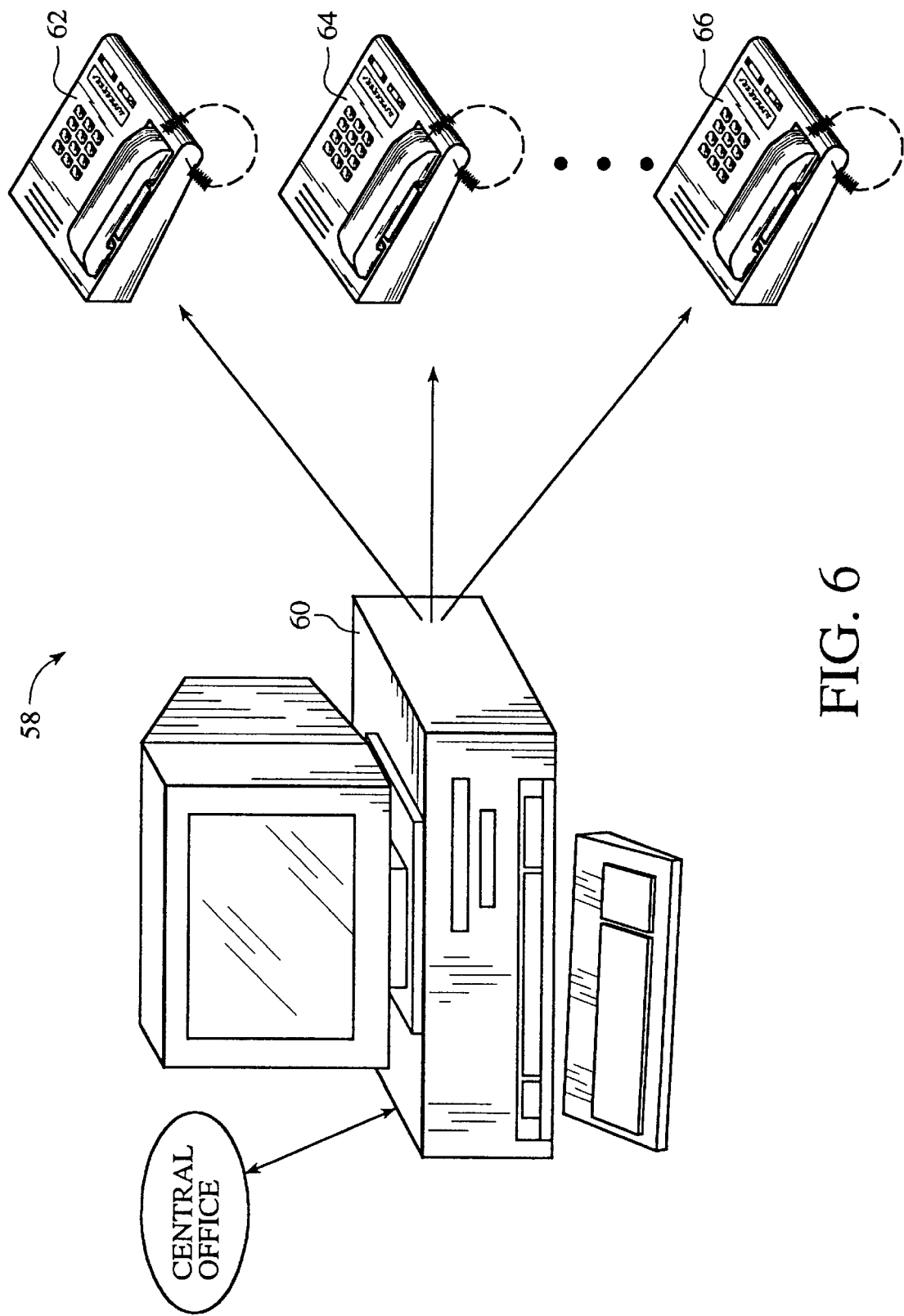
FIG. 6 is a telephone network in accordance with a second embodiment of the invention.

FIG. 6 illustrates a second embodiment of the invention. The system 58 of FIG. 6 includes a central computer 60 and a number of individual display telephones 62, 64 and 66, such as the one shown in FIG. 1. The system 58 may be a network in which each of the display telephones is assigned to a different agent to handle a high volume of inbound calls and simultaneously handle outbound calls. Certain agents may be assigned primarily to the outbound calls, but should handle inbound calls if the number of calls on hold reaches a predetermined threshold. Likewise, other agents may be assigned primarily to inbound calls, but may have responsibility with respect to initiating outbound calls, such as when an inbound call requires a later followup call.

Figure 7:
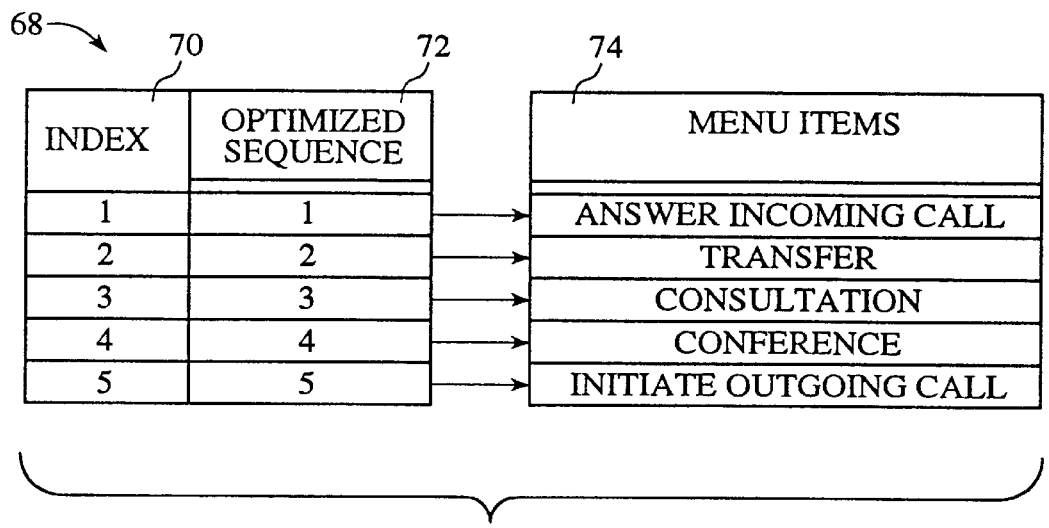
FIG. 7 is a responsibility table and data structure for an agent utilizing the network of FIG. 6.

A first responsibility code is shown in FIG. 7 in the same manner as FIG. 3. This is a table 68 that is stored in memory. The table includes an index of options in a first column 70 and a sequence column 72 for defining the order of the options as they will be presented to individual agents at the display telephones 62, 64 and 66 of FIG. 6. The responsibility code of FIG. 7 provides a sequence for agents that are assigned to inbound calls. The data structure 74 provides that the first menu item that will be presented to the particular agent will be an option to answer an incoming call. If the agent selects this option, the connection to the incoming call is made to the agent's display telephone. The agent then has a number of other options. The next-displayed option is to transfer the call to another party, such as the person requested by the caller. A receptionist is likely to utilize this option for a high percentage of the incoming calls.

The third option that is presented to the agent that is assigned to primarily handle incoming calls is shown as being a consultation option. This allows the agent to temporarily place the caller on hold in order to provide time for the agent to consult with a person having a greater expertise in the field to which the call is related. After the consultation, the original caller is taken off hold. The fourth option is one that allows a conference call of more than two individuals to be achieved. For example, the agent, the original caller and a subsequently called individual may be connected simultaneously in order to discuss the matter of interest of the original caller.

In some instances, the agent that is assigned the sequence of FIG. 7 may be required to initiate an outgoing call. By scrolling through the first four options, the agent may select the fifth option, thereby causing the network to provide an open line for an outgoing call. However, since this option is the least likely to be selected for the agent assigned to incoming calls, the option of initiating an outgoing call is at the end of the sequence of options to be displayed. This minimizes the time that the agent will spend scrolling through the options.

Figure 8:
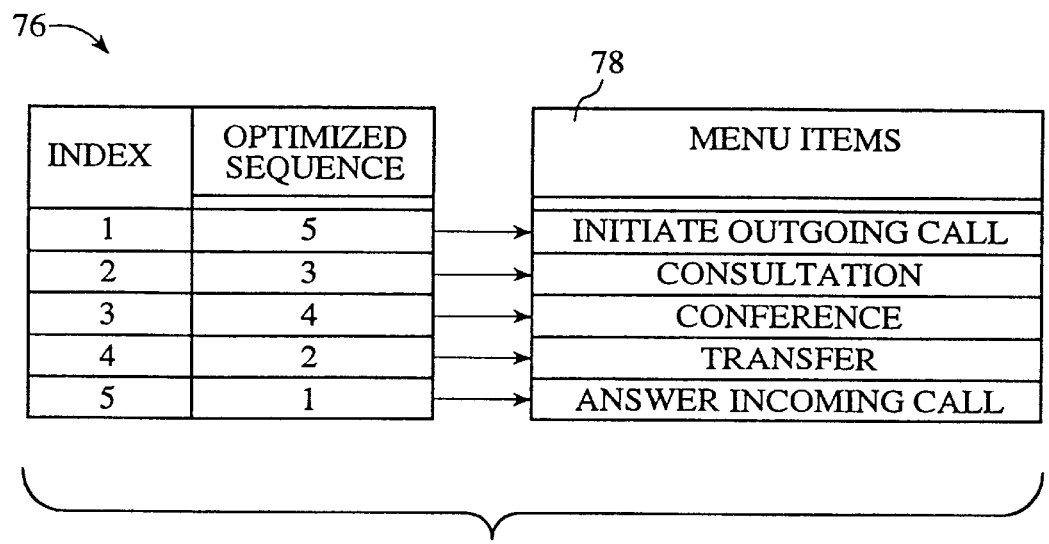
FIG. 8 is a task-based responsibility table for the same agent, following a shift in the primary responsibility of the agent.

If the central computer 60 of FIG. 6 detects that the frequency of incoming calls has dropped below a preselected threshold, the agent may be automatically or manually switched to initiating outgoing calls. Referring now to FIG. 8, a second table 76 of the same options is then automatically substituted, but with the "optimized" sequence being shifted, so that the progression of menu items reflects the shift in primary responsibility of the agent. As indicated by the task-based data structure 78, the first-displayed menu item will be the option to initiate an outgoing call. Once the call is made, the consultation option is displayed at the display telephone of the agent. If the agent does not wish to select this option, the menu is scrolled to the conference option. The fourth-presented option is to transfer the call. Since the agent is the one that initiated the call, this option is the one that is typically least likely to be selected. For this reason, the option proceeds only the one to answer an incoming call.

The responsibility codes 68 and 76 and the data structures 74 and 78 of FIGS. 7 and 8 may be stored at the central computer 60, allowing the central computer to generate each of the text strings for display at the individual telephones 62, 64 and 66. Alternatively, at least some of the data storage may be at the individual display telephones. As another alternative, one of the data structures may add or delete an option, such as deleting the ability of an inbound-call agent to initiate any outbound calls.

The advantages described with reference to FIGS. 2–5 apply equally to the system 58 of FIG. 6. That is, the resequencing of menu items provides a time savings for a user, reduces processing requirements on a system, and reduces traffic on any communication link that may be involved in certain implementations of the invention.

We claim:

1. A method of sequencing menu items of a menu-driven user/system interface comprising steps of:

establishing an initial sequence for serially presenting menu items to a user for selection of at least one menu item to the exclusion of other menu items;

preselecting a period of time within which said menu items are to be presented in said initial time sequence;

monitoring user selection of said menu items;

recording each said user selection of said menu items over said preselected period of time;

reordering presentation of said menu items in response to said step of monitoring user selection such that an adapted sequence is established based upon frequency of selection of said menu items, said step of reordering said presentation being executed only after said preselected period of time; and initiating a serial presentation of said menu items in an order defined by said adapted time sequence in which all of said menu items are included.

2. The method of claim 1 wherein said step of reordering said presentation is executed periodically, thereby defining an adapted time sequence after each passage of said preselected period of time.

3. The method of claim 1 wherein said step of reordering said presentation is executed upon a user inputting a command to initiate said reordering based upon said selections over said period of time.

4. The method of claim 1 wherein each serial presentation of said menu items includes a step of displaying menu options in a one-by-one fashion on a screen of a display telephone.

5. The method of claim 1 further comprising disabling said step of reordering said presentation, thereby re-establishing said initial sequence for serially presenting said menu items.

6. The method of claim 1 wherein said step of monitoring user selection includes storing in memory each selection of one of said menu items such that each menu item is associated with a count that is incrementally increased upon each selection of said each menu item.

7. The method of claim 1 wherein said menu items are main menu items in which selection of at least one main menu item initiates a display of a subroutine of submenu items, said method further comprising steps of:

(a) serially presenting said subroutine for selection of at least one submenu item to the exclusion of other ones of said submenu items;

(b) monitoring user selection of said submenu items; and (c) reordering said submenu items for subsequent serial presentations of said subroutine items, with reordering being based upon frequency of selection of said submenu items.

8. A method of adaptively sequencing menu options of a user interface comprising steps of:

(a) displaying menu options in a sequential manner in which less than all of said menu options are displayed at a single time;

(b) for a number of different times, repeating step (a) of displaying said menu options;

(c) during each of steps (a) and (b) of displaying said menu options, counting the number of times each menu option is selected;

(d) based upon said step (c) of counting, arranging said menu options in a frequency-based order that is responsive to frequency of selection of said menu options, wherein said arranging of said menu options in a frequency-based order includes all of said menu options and is initiated by a first occurrence of a user-initiated command and expiration of a preselected time period; and (e) repeating steps (a), (b) and (c) such that displaying said menu options is in said frequency-based order.

9. The method of claim 8 wherein said steps of displaying said menu options are steps of presenting said menu options on a display screen of a display telephone.

10. The method of claim 8 further comprising a step of permitting a user to disable said step (d) of arranging said menu options in a frequency-based order.

* * * * *